United States Patent
Brown et al.

(10) Patent No.: US 10,754,730 B2
(45) Date of Patent: Aug. 25, 2020

(54) COPYING POINT-IN-TIME DATA IN A STORAGE TO A POINT-IN-TIME COPY DATA LOCATION IN ADVANCE OF DESTAGING DATA TO THE STORAGE

(71) Applicant: International Business Machines Corporation, Armonk, NY (US)

(72) Inventors: Theresa M. Brown, Tucson, AZ (US); Kevin Lin, Tucson, AZ (US); David Fei, Tucson, AZ (US); Nedlaya Y. Francisco, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 16/123,618

(22) Filed: Sep. 6, 2018

(65) Prior Publication Data
US 2020/0081792 A1    Mar. 12, 2020

(51) Int. Cl.
G06F 12/00 (2006.01)
G06F 11/14 (2006.01)
G06F 3/06 (2006.01)
G06F 12/0868 (2016.01)

(52) U.S. Cl.
CPC .......... *G06F 11/1451* (2013.01); *G06F 3/065* (2013.01); *G06F 3/067* (2013.01); *G06F 3/0619* (2013.01); *G06F 11/1464* (2013.01); *G06F 11/1469* (2013.01); *G06F 12/0868* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 6,567,888 B2 | 5/2003 | Kedem | |
| 6,611,901 B1* | 8/2003 | Micka | G06F 3/0614 |
| | | | 711/113 |
| 7,543,110 B2 | 6/2009 | Stolowitz | |
| 8,010,495 B1 | 8/2011 | Kuznetzov et al. | |

(Continued)

OTHER PUBLICATIONS

IBM, "Clarification of Supported and Unsupported Methodology for Flashcopy Backups of Mounted AIX Filesystems" (Year: 2008).*

(Continued)

*Primary Examiner* — Ryan Bertram
*Assistant Examiner* — Trang K Ta
(74) *Attorney, Agent, or Firm* — Konrad Raynes Davda & Victor LLP; David W. Victor

(57) ABSTRACT

Provided are a computer program product, system, and method for copying point-in-time data in a storage to a point-in-time copy data location in advance of destaging data to the storage. A point-in-time copy is created to maintain tracks in a source storage unit as of a point-in-time. A source copy data structure indicates tracks in the source storage unit to copy from the storage to a point-in-time data location. An update to write to a source track is received and a determination is made as to whether the source copy data structure indicates to copy the source track from the storage to the point-in-time data location. The update is written to a cache. A copy operation is initiated to copy the source track from the storage to the point-in-time data location asynchronous before the source track is destaged from the cache to the storage unit.

24 Claims, 7 Drawing Sheets

(56) References Cited

U.S. PATENT DOCUMENTS

| | | | |
|---|---|---|---|
| 8,055,938 | B1 | 11/2011 | Chatterjee et al. |
| 8,533,397 | B2 | 9/2013 | Bar-El et al. |
| 8,549,225 | B2 | 10/2013 | Blinick et al. |
| 8,713,272 | B2 | 4/2014 | Agombar et al. |
| 8,850,106 | B2 | 9/2014 | Benhase et al. |
| 8,938,428 | B1 | 1/2015 | Ozekinci et al. |
| 9,471,499 | B2 | 10/2016 | Brown et al. |
| 9,558,072 | B1 | 1/2017 | Mam |
| 9,600,375 | B2 | 3/2017 | Dain et al. |
| 9,600,377 | B1 | 3/2017 | Cohen et al. |
| 9,626,115 | B2 | 4/2017 | Dain et al. |
| 9,658,798 | B2 | 5/2017 | Ash et al. |
| 9,733,862 | B1 | 8/2017 | Klemm et al. |
| 9,817,724 | B2 | 11/2017 | Dain et al. |
| 9,852,198 | B1 | 12/2017 | Kuznetzov et al. |
| 9,857,962 | B2 | 1/2018 | Yui et al. |
| 9,857,996 | B2 | 1/2018 | Wilkinson |
| 9,927,980 | B1 | 3/2018 | LeCrone et al. |
| 10,013,361 | B2 | 7/2018 | Mannenbach et al. |
| 2004/0181639 | A1* | 9/2004 | Jarvis .................. G06F 11/2069 711/161 |
| 2005/0071372 | A1 | 3/2005 | Bartfai et al. |
| 2005/0071586 | A1* | 3/2005 | Bartfai ................ G06F 12/0826 711/162 |
| 2005/0171979 | A1 | 8/2005 | Stager et al. |
| 2006/0106891 | A1 | 5/2006 | Mahar et al. |
| 2008/0155216 | A1 | 6/2008 | Shoham |
| 2008/0222377 | A1 | 9/2008 | Wightwick et al. |
| 2014/0108756 | A1 | 4/2014 | Brown et al. |
| 2014/0344526 | A1 | 11/2014 | Brown et al. |
| 2015/0081628 | A1 | 3/2015 | Brown et al. |
| 2015/0261678 | A1 | 9/2015 | Gupta et al. |
| 2015/0286424 | A1 | 10/2015 | Dain et al. |
| 2015/0286432 | A1 | 10/2015 | Dain et al. |
| 2015/0286542 | A1 | 10/2015 | Dain et al. |
| 2016/0232102 | A1 | 8/2016 | Ash et al. |
| 2016/0253121 | A1 | 9/2016 | Guo et al. |
| 2016/0259574 | A1 | 9/2016 | Carpenter et al. |
| 2016/0291890 | A1 | 10/2016 | Jennas et al. |
| 2017/0109283 | A1* | 4/2017 | Ash ..................... G06F 12/0815 |
| 2017/0153950 | A1 | 6/2017 | Iwasaki et al. |
| 2017/0161153 | A1 | 6/2017 | Dain et al. |
| 2017/0177443 | A1 | 6/2017 | Figueroa et al. |
| 2017/0351619 | A1* | 12/2017 | Ash ....................... G06F 12/126 |
| 2018/0136874 | A1 | 5/2018 | Karve et al. |
| 2018/0150229 | A1 | 5/2018 | Brown et al. |

OTHER PUBLICATIONS

U.S. Appl. No. 16/123,674, filed Sep. 6, 2018.
U.S. Appl. No. 16/123,771, filed Sep. 6, 2018.
U.S. Appl. No. 16/123,635, filed Sep. 6, 2018.
U.S. Appl. No. 16/123,660, filed Sep. 6, 2018.
U.S. Appl. No. 16/123,486, filed Sep. 6, 2018.
U.S. Appl. No. 15/611,569, filed Jun. 1, 2017.
U.S. Appl. No. 15/663,727, filed Jul. 29, 2017.
U.S. Appl. No. 15/828,288, filed Nov. 30, 2017.
U.S. Appl. No. 15/828,302, filed Nov. 30, 2017.
Azaguiy et al.; "Point-in-Time Copy: Yesterday, Today and Tomorrow", IBM Storage Systems Group, 2002, pp. 259-270.
Anonymous, "Data Aware Optimized Backups—Object & System Level", dated Jun. 2, 2016, An IP.com Prior Art Database Technical Disclosure, IPCOM000246384D, Total 7 pages.
IBM, "Data Protection Manager for Exchange 2010 and the IBM® Storwize® V7000 with SAN Based Replica Creation and Recovery" Installation and Configuration Guide, dated Jul. 2011, Version: 2.7.4,Total 44 pages.
Dufrasne et al., "IBM DS8880 Architecture and Implementation (Release 8.3)", IBM, Nov. 2017, Total 510 pp.
EMC et al.; "Introduction to XtremIO Virtual Copies", White Paper, Part No. H13035-01 (Rev. 02), Mar. 2016, pp. 1-39.
Brooks et al., "IBM Tivoli Storage Manager for Advanced Copy Services" dated Dec. 2006, International Technical Support Organization, Total 318 pages.
Lim, S. et al., "Efficient Journaling Writeback Schemes for Reliable and High-Performance Storage Systems", Pers Ubiquit Comput, 17, 2013, 14 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Sep. 2011, Computer Security Division Information Technology Laboratory National Institute of Standards and Technology, Total 7 pp.
Anonymous, "Method for Enhanced Application Performance During FlashCopy Restore in Multi-tier Storage Environment", dated Nov. 28, 2017, An IP.com Prior Art Database Technical Disclosure, IPCOM000251706D, Total 8 pages.
Taylor, Chris; "Effective Backups: Selecting the Right Backup Mechanism to Match the Business Requirement", Session 16273, pp. 1-62, 2014.
Anonymous, "Tweak Modification to Improve Reliability and Durability in an Encrypted Flash Based Back-Up System" dated Jan. 25, 2017, An IP.com Prior Art Database Technical Disclosure, IPCOM000248984D, Total 4 pages.
Wu, et al., "LDM: Log Disk Mirroring with Improved Performance and Reliability for SSD-Based Disk Arrays", ACM Transactions on Storage, vol. 12, No. 4, Article 22, May 2016, 21 pp.
Yang et al.; "TRAP-Array: A Disk Array Architecture Providing Timely Recovery to Any Point-in-time," 33rd International Symposium on Computer Architecture (ISCA'06), Boston, MA, 2006, pp. 289-301.
Wikipedia, "Binary Search Algorithm", [online], edited on Aug. 14, 2018. Retrieved from the Internet at: <URL: https://en.wikipedia.org/w/index.php?title=Binary_search_algorithm&oldid=854879077>, Total 8 pp.
U.S. Appl. No. 16/123,445, filed Sep. 6, 2018.
U.S. Appl. No. 16/123,412, filed Sep. 6, 2018.
U.S. Appl. No. 16/123,457, filed Sep. 6, 2018.

* cited by examiner

Point-in-Time Copy

Consistency Group

COPYING POINT-IN-TIME DATA IN A STORAGE TO A POINT-IN-TIME COPY DATA LOCATION IN ADVANCE OF DESTAGING DATA TO THE STORAGE

BACKGROUND OF THE INVENTION

1. Field of the Invention

The present invention relates to a computer program product, system, and method for copying point-in-time data in a storage to a point-in-time copy data location in advance of destaging data to the storage.

2. Description of the Related Art

In a storage environment, a storage controller may create point-in-time ("PiT") copies of a production volume using point-in-time copy techniques, such as the IBM Flash-Copy® (FlashCopy is a registered trademark of IBM), snapshot, etc. A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the target volume.

When creating a point-in-time copy, the storage controller may process a reserve command to freeze Input/Output (I/O) operations while the data structures are being created, resources allocated, and data destaged from cache. When everything is created for the point-in-time copy relationship, then the I/O operations may be allowed to continue so that any data updated will be part of the new consistency group being created.

There is a need in the art for improved techniques for creating point-in-time copes of storage units, such as volumes.

SUMMARY

Provided are a computer program product, system, and method for copying point-in-time data in a storage to a point-in-time copy data location in advance of destaging data to the storage. A point-in-time copy is created to maintain tracks in a source storage unit as of a point-in-time. A source copy data structure indicates tracks in the source storage unit to copy from the storage to a point-in-time data location. An update to write to a source track is received and a determination is made as to whether the source copy data structure indicates to copy the source track from the storage to the point-in-time data location. The update to the source track is written to a cache. A copy operation is initiated to copy the source track from the storage to the point-in-time data location asynchronous with respect to the update to the source track before the source track is destaged from the cache to the storage unit.

With the above embodiment, the time to create the point-in-time copy data structures and destage data from cache during the reservation process is reduced by using a source copy data structure indicating tracks in a source volume to copy from storage to a point-in-time copy data location before data is destaged to the storage by performing an asynchronous copy operation to copy the point-in-time data in the storage to a point-in-time data location. This asynchronous copy operation may be performed during normal I/O operations before the data is destaged during the pendency of the current point-in-time copy or when creating a next point-in-time copy, such as during reservation. This allows for the copying of the point-in-time data in the storage to a point-in-time data location in advance of creating the next point-in-time copy in order to reduce latency in establishing the next point-in-time copy and reduce the time to complete reservation operations in response to a reservation command. In this way, described embodiments provide techniques to minimize the time needed to reserve resources and destage tracks in cache when creating a new point-in-time copy.

In a further embodiment, indication is made in the source copy data structure to not copy the source track from the storage to the point-in-time data location in response to the copy operation copying the source track from the storage to the point-in-time data location.

With the above embodiment, indication is made that the point-in-time data is saved-off to the point-in-time data location so that upon future writes to the cache, there is no need to again save off the data for the updated track in the storage because the point-in-time data was previously copied.

In a further embodiment, indication is made in the source copy data structure to copy all tracks in the source storage unit in the storage to the point-in-time data location when creating the point-in-time copy.

With the above embodiment, the source copy data structure indicates that all of the tracks in the storage need to be copied to ensure that point-in-time data is indicated to be copied before data is destaged before or during the creation of the next point-in-time copy.

In a further embodiment, an operation is initiated to destage an update to a track in the cache to the storage. A determination is made as to whether the source copy data structure indicates to copy the track to destage from the storage to the point-in-time data location in response to initiating the operation to destage the update to the track. The track to destage is copied from the storage to the point-in-time data location in response to determining that the source copy data structure indicates to copy the track and the update to the track to destage is written from the cache to the storage in response to copying the track from the storage to the point-in-time data location.

With the above embodiment, the source copy data structure is used to make sure to copy-off the point-in-time data to the point-in-time data location before the track is destaged to the storage to avoid overwriting the point-in-time data for the current point-in-time copy being formed. Further, by performing this operation during normal operations, most of the data will have been destaged before creating the next point-in-time copy, thus reducing the time to perform the reservation operation during creation of the next point-in-time copy.

In a further embodiment, the update to the track to destage is written to the storage in response to determining that the source copy data structure does not indicate to copy the track to destage from the storage to the point-in-time data location.

With the above embodiment, if the source copy data structure indicates to not copy the track from the storage to the point-in-time data location, then the data may be written from the cache to the storage without copying the track from the storage to the point-in-time data location, because the source copy data structure indicates that point-in-time data has already been copied.

In a further embodiment, the point-in-time copy comprises a first point-in-time copy and the point-in-time of the point-in-time copy comprises a first point-in-time. An operation is initiated to create a second point-in-time copy at a second point-in-time and, in response, tracks having updates in the cache are determined and copied from the storage to the point-in-time data location in response to the source copy data structure indicating to copy the track. Updates in the cache are destaged to the storage for each track copied from the storage to the point-in-time data location.

With the above embodiment, when creating the new/second point-in-time copy, any updates to tracks still in the cache by first copying the tracks having updates from storage to the point-in-time data location if the source copy data structure indicates to copy to make sure the point-in-time data gets saved-off before being overwritten by updated data in the cache.

In a further embodiment, in response to initiating the operation to create the second point-in-time copy further comprise, indication is made in the source copy data structure to not copy each track, having updates in the cache, copied from the storage to the point-in-time data location.

In a further embodiment, in response to initiating the operation to create the second point-in-time copy, updates to tracks in the cache are destaged to the storage that the source copy data structure indicates to not copy from the storage to the point-in-time data location.

In a further embodiment, the point-in-time copy comprises a first point-in-time copy and the point-in-time of the point-in-time copy comprises a first point-in-time, and the source track comprises a first source track. An operation is initiated to establish a second point-in-time copy at a second point-in-time. In response to initiating the operation to create the second point-in-time copy, a write to update a second source track in the source storage unit is received while performing operations to establish the second point-in-time copy and before establishing and starting the second point-in-time copy. A determination is made as to whether there is a previous update to the second source track in the cache and, if so, a determination is made as to whether the source copy data structure indicates to copy the second source track. The second source track in the storage is copied to the point-in-time data location in response to determining that the source copy data structure indicates to copy the second source track. The previous update for the second source track from the cache is destaged to the storage in response to copying the second source track in the storage to the point-in-time data location. The update to the second source track is written to the cache after destaging the previous update.

With the above embodiment, if during the reservation operation to destage tracks from the cache a new update is received, to a second source track already having a previous update in cache waiting to destage, then the point-in-time data is copied before the destage of the previous update to the track in the storage so that the previous update may be destaged without overwriting the point-in-time data before it is copied to the point-in-time data location. The source copy data structure is further used to avoid having to further copy the source track being updated during reservation operations to the point-in-time data location after the point-in-time data was saved to the point-in-time data location.

In a further embodiment, in response to initiating the operation to create the second point-in-time copy, indication is made in the source copy data structure to not copy the second source track from the storage to the point-in-time data location in response to copying the second source track in the storage to the point-in-time data location.

In a further embodiment, in response to initiating the operation to create the second point-in-time copy, the previous update for the second source track is destaged from the cache to the storage in response to determining that the source copy data structure indicates to not copy the second source track from the storage to the point-in-time data location.

In a further embodiment, in response to initiating the operation to create the second point-in-time copy, the update is written to the second source track to the cache in response to determining that there is no previous update to the second source track in the cache.

In a further embodiment, the initiating the operation to create the second point-in-time copy is performed in response to receiving a reservation command as part of creating a second point-in-time copy to perform a reservation operation. Complete is returned to the reservation command after destaging updates to the determined tracks having updates in the cache. A freeze command is received to suspend I/O operations to the source storage unit after returning complete to the reservation command. Complete is returned to the freeze command in response to suspending I/O operations to the source storage unit. A thaw command is received to end suspension of I/O operations to the source storage unit. Updates to tracks in the source storage unit for the second point-in-time copy are recorded in response to returning complete to the thaw command after ending suspension of the I/O operations.

With the above embodiment, the creation of the point-in-time copies for all storage units in a consistency group is synchronized by freezing I/O operations at the volumes in the consistency group after the reservation operations and then thawing or ending the suspension of I/O requests, to synchronize the starting of the point-in-time copies for all volumes in the consistency group by suspending I/O operations after completing the reservation operations, and when all volumes in the consistency group freeze I/O, receiving a thaw command to synchronize the activation of the current point-in-time copy with the other volumes in the same or different storage controllers.

DETAILED DESCRIPTION

In current art, the time required to establish consistency groups or point-in-time copies for multiple volumes can cause substantial interruptions to I/O processing because I/O operations need to be suspended at the volumes subject to the point-in-time copy creation while the data structures for the point-in-time copies are created. Further, to create the point-in-time copy, data needs to be destaged from cache to storage, and before data is destaged to the storage, point-in-time data for a previous point-in-time copy needs to be copied to a target location to be available for the previous point-in-time copy. For instance, to create point-in-time copies at storage controllers for volumes in a consistency group, a reservation command is sent to the storage controllers to create the point-in-time copy data structures and destage data from cache. This reservation process can take a substantial amount of time and delay the creation and activation of a next point-in-time copy in a series of point-in-time copies to create multiple recovery points for a source volume.

Described embodiments provide improved techniques for reducing the time to create the point-in-time copy data structures and destage data from cache during the reservation process by using a source copy data structure indicating tracks in a source volume to copy from storage to a point-in-time copy data location before data is destaged to the storage by performing an asynchronous copy operation to copy the point-in-time data in the storage to a point-in-time data location. This asynchronous copy operation may be performed during normal I/O operations before the data is destaged during the pendency of the current point-in-time copy or when creating a next point-in-time copy, such as during reservation. This allows for the copying of the point-in-time data in the storage to a point-in-time data location in advance of creating the next point-in-time copy in order to reduce latency in establishing the next point-in-time copy and reduce the time to complete reservation operations in response to a reservation command. In this way, described embodiments provide techniques to minimize the time needed to reserve resources and destage tracks in cache when creating a new point-in-time copy.

Figure 1:
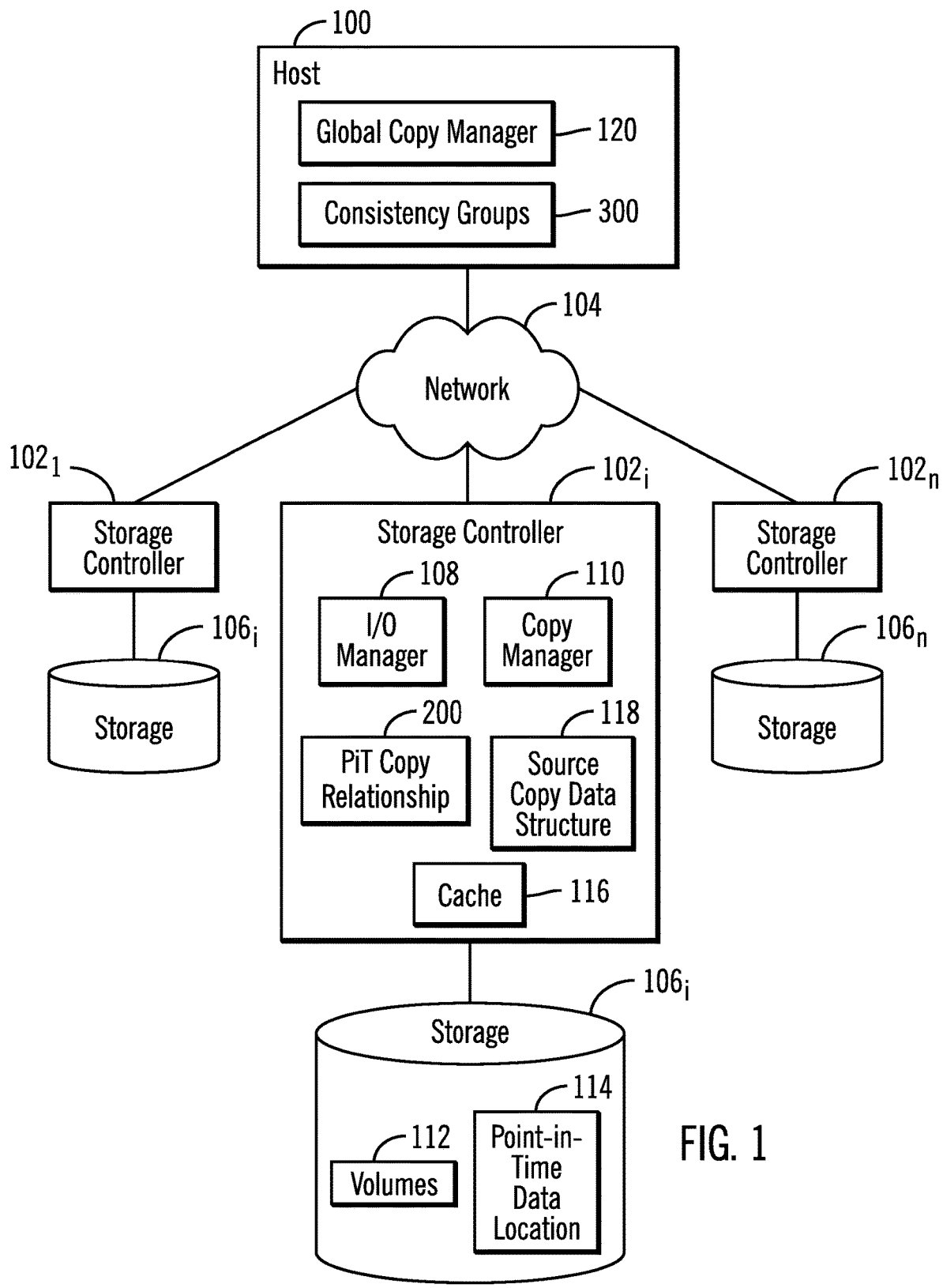
FIG. 1 illustrates an embodiment of a backup storage environment.

FIG. 1 illustrates an embodiment of a data backup environment having a host system 100 that is connected to a plurality of storage controllers $102_1 \ldots 102_i \ldots 102_n$ over a network 104, each storage controller $102_1 \ldots 102_i \ldots 102_n$ managing access to volumes configured in logical subsystems in the storages $106_1 \ldots 106_i \ldots 106_n$, respectively. There may be additional hosts (not shown) that provide Input/Output (I/O) requests to the storage controllers $102_1 \ldots 102_i \ldots 102_n$. Each of the storage controllers $102_1 \ldots 102_i \ldots 102_n$ include components as shown with respect to storage controller $102_i$, including an I/O manager 108 to manage I/O operations directed to the storage $106i$, a copy manager 110 to manage copy operations, such as creating point-in-time copies, such as a snapshot, Flash-Copy® (FlashCopy is a registered trademark of IBM), snapshot, etc. The copy manager 110 creates point-in-time copy relationships 200, where each point-in-time copy relationship $200_i$ represents a point-in-time copy of one or more volumes 112 configured in the storage $106_i$.

The copy manager 110 stores point-in-time data for a point-in-time copy $200_i$ in a point-in-time data location 114 in the storage $106i$, which may store point-in-time data, comprising data for a point-in-time copy $200_i$ before the data is updated while the point-in-time copy $200_i$ is open. The point-in-time data location 114 may comprise a log file to store point-in-time data from multiple point-in-time copies 200 or comprise other types of files or data structures to store the point-in-time data for a point-in-time copy $200_i$.

There may be separate point-in-time data location 114 instances, such as a log, for multiple point-in-time copies of a same volume 112 maintained by the storage controller $102_i$ to allow recovery of the volume 112 at different points-in-time.

The storage controller $102_i$ further includes a cache 116 to cache updates to tracks in the volumes 112. A source copy data structure 118 indicates tracks in s source volume of a point-in-time copy in the storage $106_i$ that need to be copied to a point-in-time data location 114 when a copy of the track in the cache is updated. In this way, the point-in-time data in the storage $106_i$ is saved off in the point-in-time data location 114 before being updated by data destaged from the cache 116 to make room for new data in the cache 116. In one embodiment, the source copy data structure 118 comprises a bitmap having a bit for each track in the source volume of a point-in-time copy $200_i$. The bits in the bitmap 116 may be set when creating the point-in-time copy to indicate all tracks in the storage $106_i$ need to be copied to the point-in-time data location 114 if there is a destage to the tracks. When a point-in-time track is copied from the storage $106_i$ to the point-in-time data location $114l$, the bit in the source copy data structure 118 may be set to indicate that the track does not have to be copied, because the point-in-time data for the point-in-time copy being formed has been saved.

The storage $106_i$ includes volumes 112, where volumes may be configured in Logical Subsystems (LSS), where each LSS is comprised of multiple volumes 112. The term volume 112 as used herein may refer to other types of storage units comprising addressable ranges of data, such as logical devices, logical drives, partitions, etc. A track comprises any addressable storage unit representing data in storage and memory, also referred to as a block, logical address, logical block address (LBA), physical block address, etc.

The host 100 includes a global copy manager 120 to maintain consistency groups 300, where each consistency group $300_i$ provides a point-in-time copy extending across volumes 112 in different storage controllers $102_1 \ldots 102_i \ldots 102_n$.

The storage controllers $102_1 \ldots 102_i \ldots 102_n$ may comprise an enterprise storage controller/server suitable for managing access to attached storage devices, such as, but not limited to, the International Business Machine Corporation's ("IBM") DS8000® storage system or other vendor storage servers known in the art. (DS8000 is a registered trademark of IBM in countries throughout the world).

The network 104 may comprise a Storage Area Network (SAN), Local Area Network (LAN), Intranet, the Internet, Wide Area Network (WAN), peer-to-peer network, wireless network, arbitrated loop network, etc. The storages $106_1 \ldots 106_i \ldots 106_n$ may each be implemented in one or more storage devices, or an array of storage devices, may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Storage arrays may further be configured ranks in the storage devices, such as Just a Bunch of Disks (JBOD), Direct Access Storage Device (DASD), Redundant Array of Independent Disks (RAID) array, virtualization device, etc. Further, the storage devices in the storage $106_i$ may comprise heterogeneous storage devices from different vendors and different types of storage devices, such as a first type of storage devices, e.g., hard disk drives, that have a slower data transfer rate than a second type of storage devices, e.g., SSDs.

Figure 2:
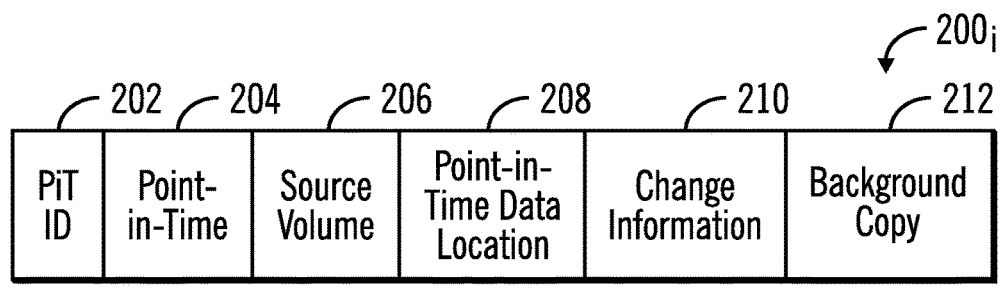
FIG. 2 illustrates an embodiment of a point-in-time copy relationship.

FIG. 2 illustrates an embodiment of an instance of a point-in-time (PiT) copy relationship $200_i$ (also referred to as a point-in-time copy) as including a point-in-time identifier 202; a point-in-time 204 or timestamp of the consistency group point-in-time 304; a source volume 206 from which data is copied; a point-in-time data location 208 indicating where the point-in-time data in the source volume 206 is copied before being updated while the point-in-time copy 202 is open, which may comprise a log file 114; change information 210, such as a change recording bitmap, indicating each data unit (e.g., track, block logical block address, etc.) in the source volume 206 that has been modified and not yet copied to the point-in-time data location 208; a background copy flag 212 to indicate whether there is a background copy operation to mirror the point-in-time copy to a secondary storage system.

A point-in-time copy replicates data in a manner that appears instantaneous and allows a host to continue accessing the source volume while actual data transfers to the copy volume are deferred to a later time. The point-in-time copy appears instantaneous because Input/Output ("I/O") complete is returned to the copy operation in response to generating the relationship data structures without copying the data from the source to the target volumes. Point-in-time copy techniques typically defer the transfer of the data in the source volume at the time the point-in-time copy relationship was established to the copy target volume until a write operation is requested to that data block on the source volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume. The point-in-time copy comprises the combination of the data in the source volume and the data to be overwritten by the updates transferred to the point-in-time data location 114.

Figure 3:
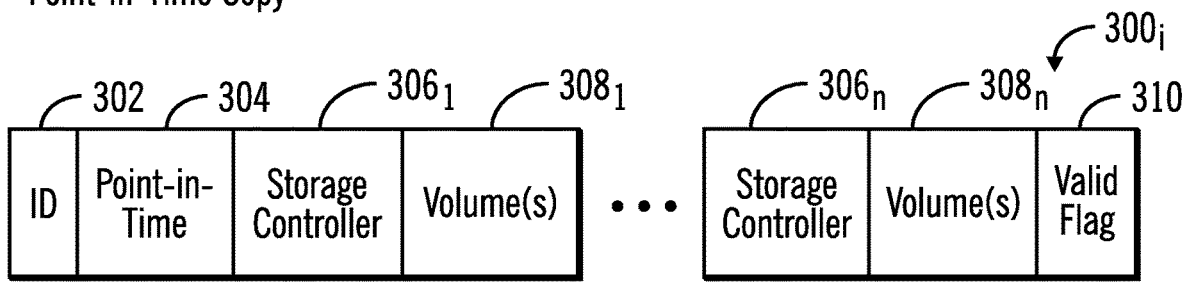
FIG. 3 illustrates an embodiment of a consistency group.

FIG. 3 illustrates an embodiment of a consistency group $300_i$ created by the global copy manager 120 to provide a point-in-time consistency group including multiple volumes 112 across one or more storage controllers $102_1 \ldots 102_i \ldots 102_n$, and includes a consistency group identifier 302, which may comprise a sequence number in a series of consistency groups being formed; a point-in-time 304 of the consistency group 302, which may be specified when the consistency group $300_1$ is first created; one or more storage controllers $306_1 \ldots 306_n$ having volumes $308_1 \ldots 308_n$ included in the consistency group 302; and a valid flag 310 indicating whether the consistency group 302 is valid or invalid.

The consistency group point-in-time 304 comprises the point-in-time 204 in all the point-in-time copies $200_i$ for the volumes $308_i \ldots 308_n$ included in the consistency group $300_i$. In this way, the consistency group $300_i$ represents multiple individual point-in-time copies $200_i$ for volumes $308_i \ldots 308_n$ in the consistency group $300_i$ that implement the consistency group $300_i$. A consistency group $300_i$ may indicate one or more volumes $308_i$ in one or more storage controllers $306_i$. In one embodiment, the volume(s) data structure $308_i$ may comprise a bitmap having a bit for each possible volume in the storage controller $306_i$, with a bit in the bitmap set to one value to indicate the volume corresponding to the bit is included in the consistency group $300_i$, and set to another value to indicate the volume at the storage controller $306_i$ is not included in the consistency group.

Figure 4:
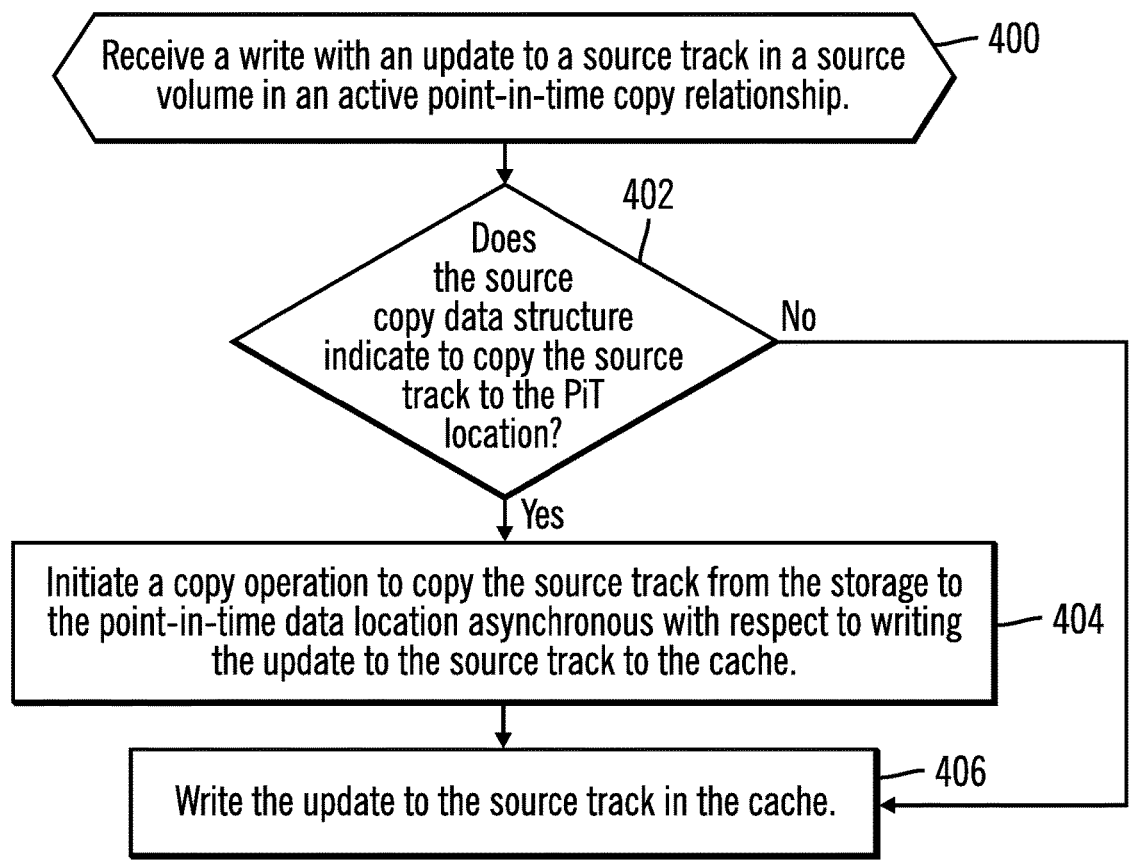
FIG. 4 illustrates an embodiment of operations to process a write to a track in a source volume of a point-in-time copy.

FIG. 4 illustrates an embodiment of operations performed by cache manager functions in the I/O manager 108 and/or copy manager 110 to process a write to a source track in a source volume 206 of an active point-in-time copy relationship $200_i$. If (at block 402) the source copy data structure 118 indicates to copy the source track to the point-in-time data location 114, then a copy operation is initiated (at block 404) to copy the source track from the storage $106_i$ to the point-in-time data location 114 asynchronous with respect to writing the update to the source track to the cache 116 and destaging the updated source track. When the copy operation is later completed and the track in the storage $106_i$ is asynchronously copied to the point-in-time data location 114, then indication is made in the source copy data structure 118 to not copy the source track. From block 404 or if (at block 402) the source copy data structure 118 does not indicate to copy the source track, then the I/O manager 108 writes (at block 406) the update to the source track in the cache 116.

With the embodiment of FIG. 4, upon updating a track in the cache 116, if the source copy data structure 118 indicates the track has not been updated during the point-in-time copy, then a copy operation is initiated to copy the point-in-time version of the track in the storage $106_i$ to the point-in-time copy data location 114 to preserve for the current point-in-time copy. This copy operation does not delay the writing of the data to the cache 116 and the asynchronous process would likely complete copying the track to the point-in-time data location 114 before having to destage tracks from the cache as part of creating a new point-in-time copy. In this way, delays in creating the point-in-time copy due to having to destage tracks in the cache 116 are minimized and latency reduced to create the point-in-time copy.

Figure 5:
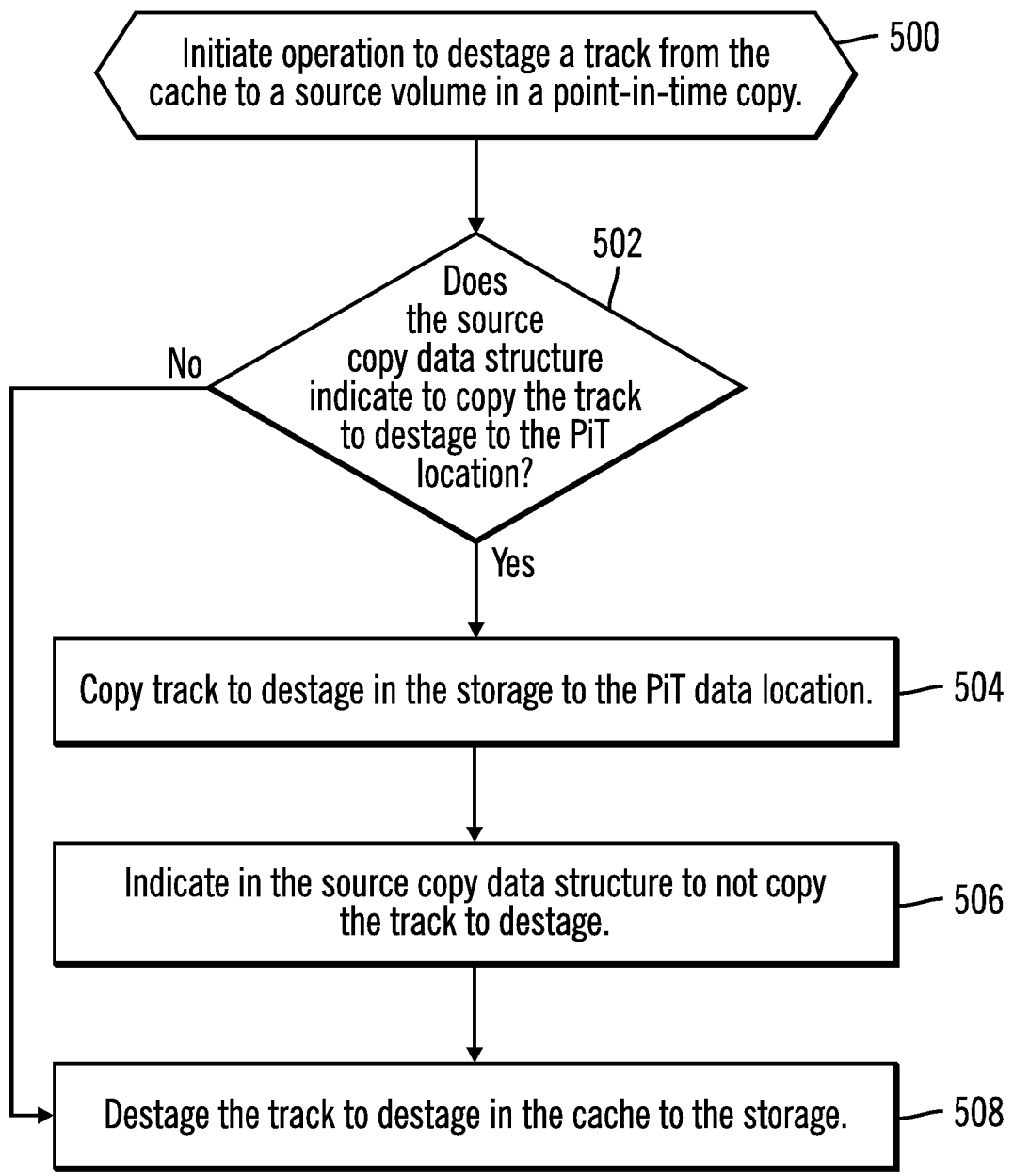
FIG. 5 illustrates an embodiment of operations to destage a track from a cache to a volume in a point-in-time copy.

FIG. 5 illustrates an embodiment of operations performed by a cache manager function in the I/O manager 108 to destage a modified/updated/written track from the cache 116 to the storage $106_i$. Upon initiating (at block 500) the destage of a track during normal I/O operations while a point-in-time copy is open, a determination is made (at block 502) whether the source copy data structure 118 indicts to copy the track to destage to the point-in-time data location 114. If so, then the version of the track to destage in the storage $106_i$ is copied (at block 504) to the point-in-time data location 114. The source copy data structure 118 is updated (at block 506) to indicate to not copy the track to destage to the point-in-time data location 114 and the track in the cache 116 is destaged (at block 508) to the storage $106_i$.

With the embodiment of FIG. 5, when destaging a track from cache as part of a normal destaging operation, such as based on a least recently used (LRU) algorithm, if the point-in-time version of the track to update in the storage $106_i$ has not yet been saved to the point-in-time data location 114, then the point-in-time data is copied before the destage of the update to the track in the storage $106_i$. The source copy data structure 118 is used to avoid having to further copy the track being updated from the destage to the point-in-time data location 114 after the point-in-time data was saved to the point-in-time data location 114.

Figure 6:
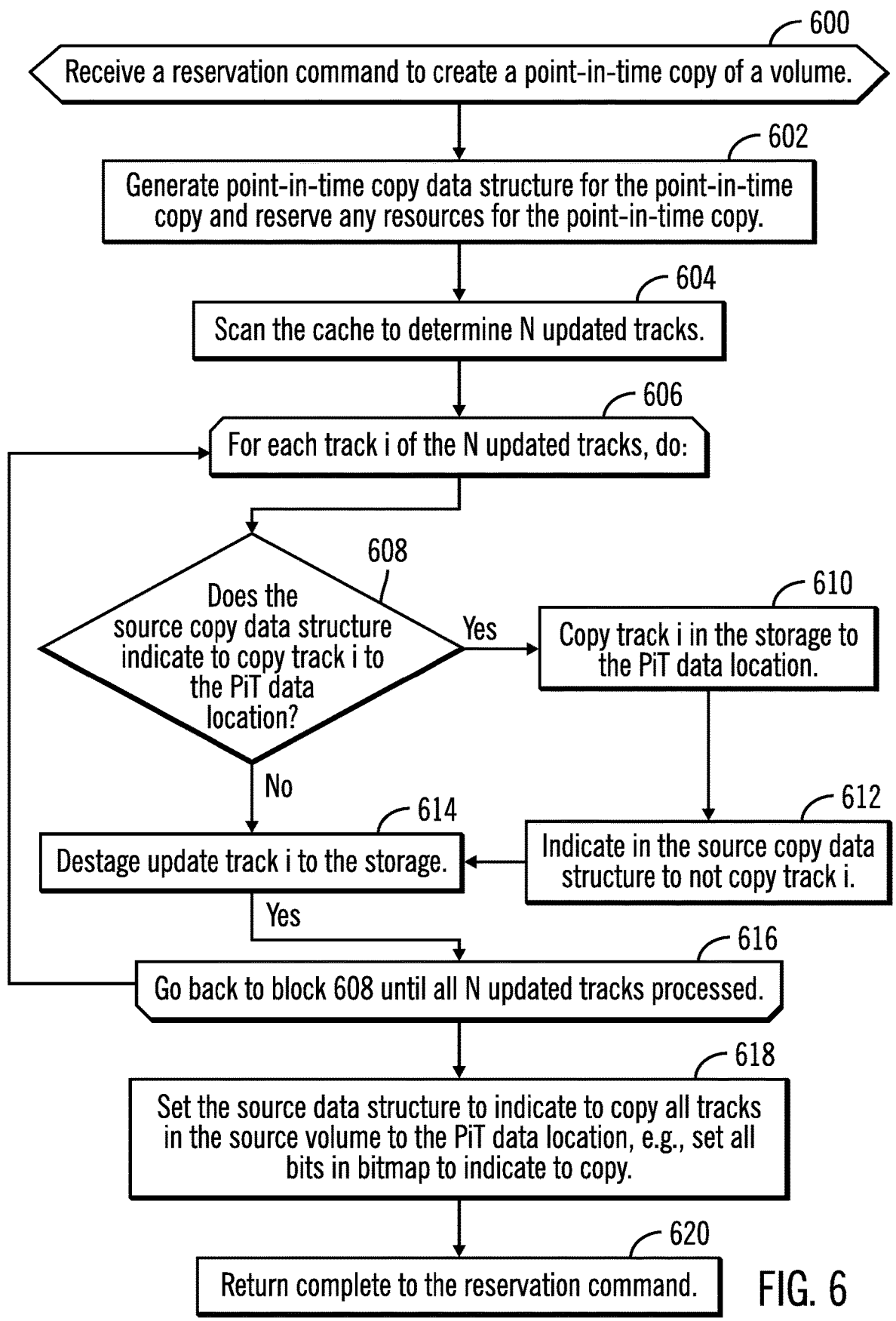
FIG. 6 illustrates an embodiment of operations to process a reservation command to create a point-in-time copy of a volume.

FIG. 6 illustrates an embodiment of operations performed by the copy manager 110 to create a new point-in-time copy $200_i$, upon receiving a reservation command. In one embodiment, the reservation command is received from the global copy manager 120 which may be creating numerous point-in-time copies for volumes 112 in one or more storage controllers $102_i$ for a consistency group $300_i$. Upon receiving (at block 600) the reservation command for a new point-in-time copy $200_i$, the copy manager 110 generates (at block 602) a point-in-time copy data structure $200_i$ for the point-in-time copy and reserves any required resources for the point-in-time copy $200_i$. The copy manager 110 scans (at block 604) the cache 116 to determined N updated tracks for the source volume 206. A loop of operations is performed from blocks 606 to 616 for each track i of the determined N updated tracks to destage.

A determination is made (at block 608) whether the source copy data structure 118 indicates to copy a track to the point-in-time data location 114. If so, then the version of the track to destage in the storage $106_i$ copied (at block 610) to the point-in-time data location 114. The source copy data structure 118 is updated (at block 612) to indicate to not copy the track to destage to the point-in-time data location 114 and the track in the cache 116 is destaged (at block 614) to the storage $106_i$. If (from the no branch of block 608) the source copy data structure 118 does not indicate to copy track i or after indicating in the source copy data structure 118 to not copy track i (at block 612), the update to track i is destaged (at block 614) from the cache 116 to the storage $106_i$.

After destaging all tracks in the cache 116 and copying point-in-time data from the storage to the point-in-time data location 114, to finalize creating the resources and data structures for the reserve command, the copy manager 110 sets (at block 618) the source copy data structure 118 to indicate to copy all tracks in the source volume 206 to the point-in-time data location 114, e.g., set all bits in bitmap to indicate to copy. Complete may then be returned (at block 620) to the reservation command so that the global copy manager 120 can continue with establishing the new point-in-time copy for all component volumes of the consistency group.

With the embodiment of FIG. 6, when creating a new point-in-time copy $200_i$, which may be part of a series of point-in-time copies $200_i$, any remaining tracks in the cache 116 to destage are destaged before continuing with creating the point-in-time copy $200_i$ in a manner that ensures all point-in-time data for the previous point-in-time copy is saved off to the point-in-time copy data location 114 to be available for the previous point-in-time copy which is being closed to make way for the new point-in-time copy.

Figure 7:
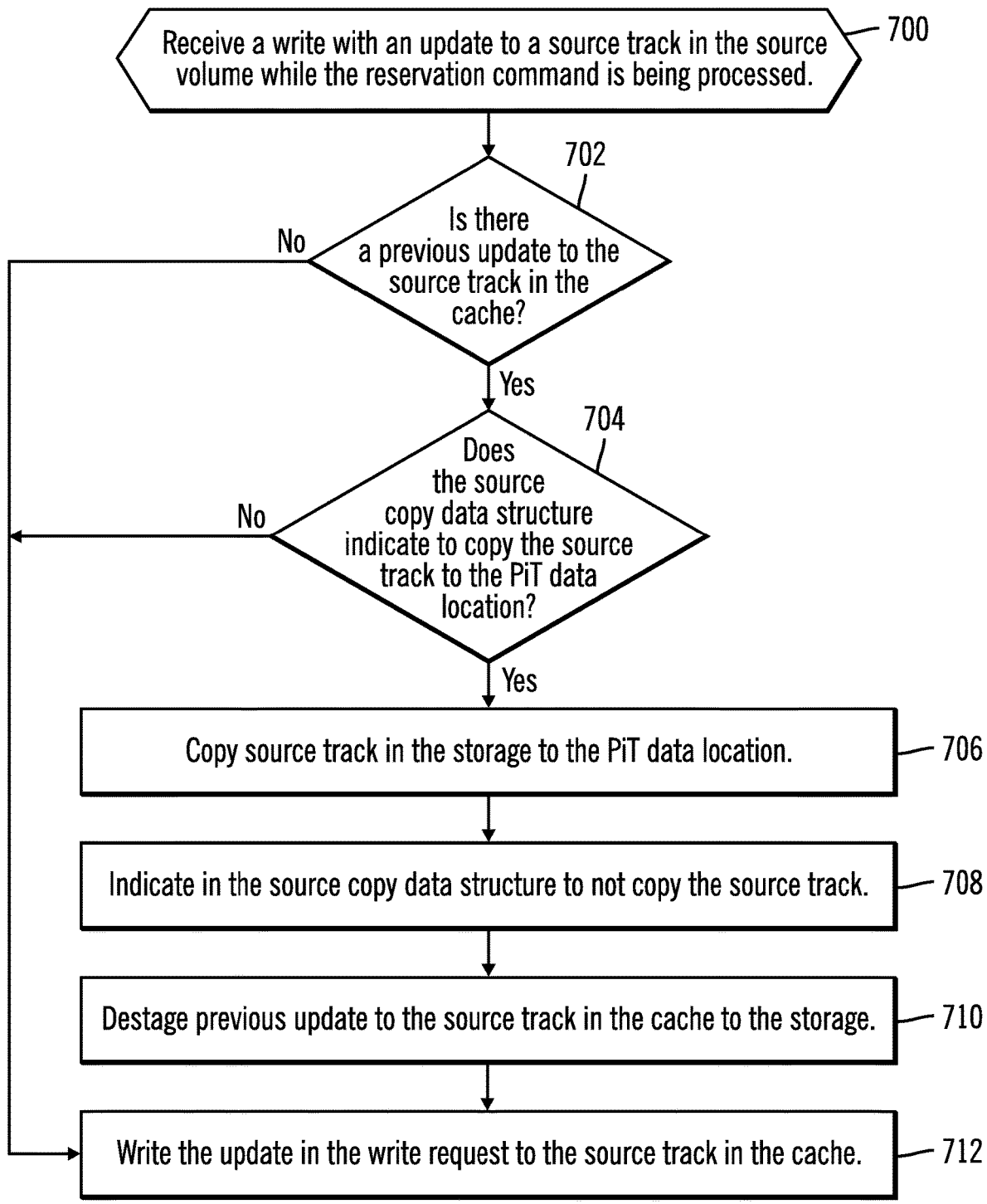
FIG. 7 illustrates an embodiment of operations to process write to a source track in the source volume of a point-in-time copy while the reservation command is being processed to create a new point-in-time copy for the source volume.

FIG. 7 illustrates an embodiment of operations performed by cache management function in the I/O manager 108 and/or copy manager 110 to process a write having an update to a source track in the source volume while the reservation command is being processed. Upon receiving (at block 700) the update, a determination is made (at block 702) whether there is a previous update to the source track in the cache 116. If so, then a further determination is made (at block 704) whether the source copy data structure 118 indicates to copy the source track to the point-in-time data location 114. If so, then the copy of the source track in the storage $106_i$ is copied (at block 706) to the point-in-time data location 114. The source copy data structure 118 is updated (at block 708) to indicate to not copy the source track being updated to the point-in-time data location 114 and the previous update to the source track in the cache 116 is destaged (at block 710) to the storage $106_i$. The update in the write request is written (at block 712) to the source track in the cache 116. If (at block 702) there is no previous update for the source track in the cache 116 or if (at block 704) the source copy data structure 118 indicates to not copy the source track, then control proceeds to block 712 to write the update to cache 116.

With the embodiment of FIG. 7, if during the reservation operation to destage tracks from the cache a new update is received, to a source track already having a previous update in cache 116 waiting to destage, then the point-in-time data is copied before the destage of the previous update to the track in the storage $106_i$ so that the previous update may be destaged to allow the new update to be written to cache 116 The source copy data structure 118 is used to avoid having to further copy the source track being updated during reservation operations to the point-in-time data location 114 after the point-in-time data was saved to the point-in-time data location 114.

In one embodiment, the global copy manager 120 sends the reservation command to all the storage controllers $306_1$ . . . $306_n$ having volumes $308_1$ . . . $308_n$ in the consistency group $300_i$ (FIG. 3) being formed to have all the storage controllers volumes $308_1$ . . . $308_n$ in the consistency group $300_i$ (FIG. 3) being formed set up their point-in-time copies $200_i$. After the global copy manager 120 receives complete to the reservation command from all the storage controllers $306_1$ . . . $306_n$ for all the volumes $308_1$ . . . $308_n$ in the consistency group $300_i$ (FIG. 3), the global copy manager 120 may send a freeze command to all of the storage controllers $306_1$ . . . $306_n$ to suspend their I/O operations to synchronize the start of the individual point-in-time copies $200_i$ and the consistency group $300_i$.

Figure 8:
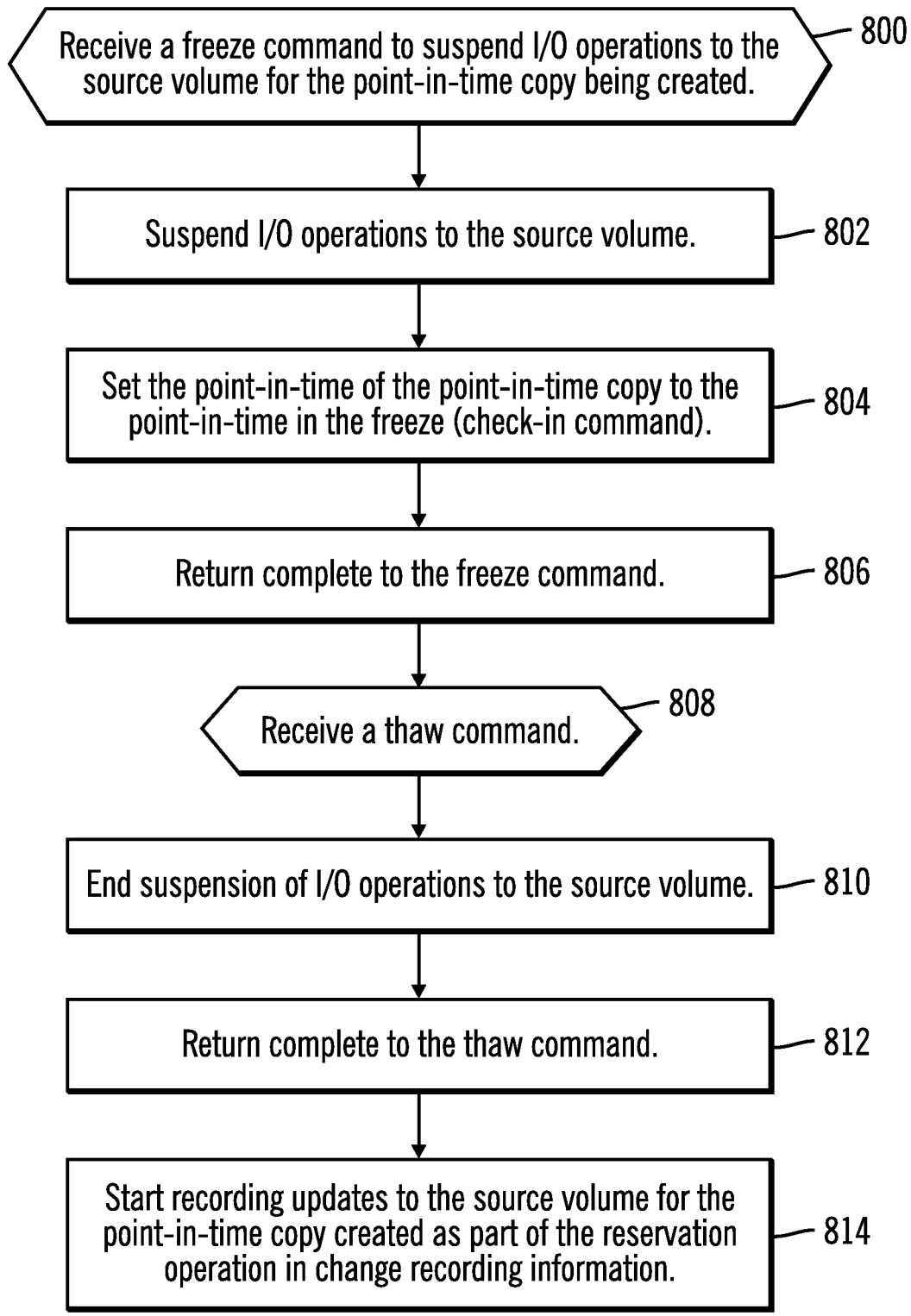
FIG. 8 illustrates an embodiment of operations to create a point-in-time copy for a consistency group providing data consistent as of a point-in-time across volumes and storage controllers.

FIG. 8 illustrates an embodiment of operations performed by one of the storage controllers $306_i$ in a consistency group $300_i$ being set-up after the reservation command is processed and updates are destaged from the cache 116 and point-in-time data in the storage $106_i$ is saved off to the point-in-time data location 114. After returning complete to a reservation command (at block 620 in FIG. 6), the storage controller $306_i$ receives (at block 800) a freeze (also known as a check-in) command to suspend I/O operations at the source volume 206 in the pint-in-time copy $200_i$ being created and suspends (at block 802) I/O operations to the source volume 206. The point-in-time 204 of the point-in-time copy $200_i$ is set (at block 804) to a point-in-time indicated with the freeze command. Complete is returned (at block 806) to the freeze command.

After the global copy manager 120 receives confirmation from all storage controllers $306_1$ . . . $306_n$ having volumes $308_1$ . . . $308_n$ in the consistency group $300_i$ (FIG. 3) being formed that the freeze successfully completed, the global copy manager 120 sends a thaw command to all the storage controllers $306_1 \ldots 306_n$ to end suspension of I/O operations and allow writes to proceed while the point-in-time copies $200_i$ implementing the consistency group $300_i$ on the storage controllers $306_1 \ldots 306_n$ are active. Upon a storage controller $308_i$ receiving (at block 808) a thaw command, suspension of I/O operations to the one or more source volumes $308_1 \ldots 308_n$ at the storage controller $308_1$, is ended (at block 810) to allow I/O requests to proceed to the or more source volumes $308_1 \ldots 308_n$ and complete is returned (at block 812) to the thaw command. After returning complete, the point-in-time copy $200_i$, for each of the volumes $308_1 \ldots 308_n$ is active and updates to the source volume 206 are recorded in the change information 210 of the point-in-time copy $200_i$.

The embodiment of FIG. 8 allows the global copy manager 120 to synchronize the creation of the local point-in-time copies $200_i$ for all the volumes $308_1 \ldots 308_n$ in the consistency group $300_i$. In this way, the consistency group $300_i$, is formed and generated by maintaining separate point-in-time copies $200_i$, for each volume defined in the consistency group $300_i$. The global copy manager 120 may manage the reservation, check-in (freeze) and thaw (unfreeze) operations to ensure that all the volumes $308_1 \ldots 308_n$ in the consistency group $300_i$ have active point-in-time copies $200_i$ operable to maintain the point-in-time data for the consistency group $300_i$. Further, if the establishment of the point-in-time copy for any volume $308_i$ in the consistency group $300_i$ fails, then the consistency group $300_i$ is marked as invalid, but the local point-in-time copies $200_i$ that were successfully established may be allowed to remain in effect to create the point-in-time copy for a subset of the volumes in the consistency group $300_i$.

In the described embodiment, variables i, m, n, etc., when used with different elements may denote a same or different instance of that element.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the storage controller $102_1$, $102_i$ . . . $102_n$ and host 100 may be implemented in one or more computer systems, such as the computer system 902 shown in FIG. 9. Computer system/server 902 may be described in the general context of computer system executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

Figure 9:
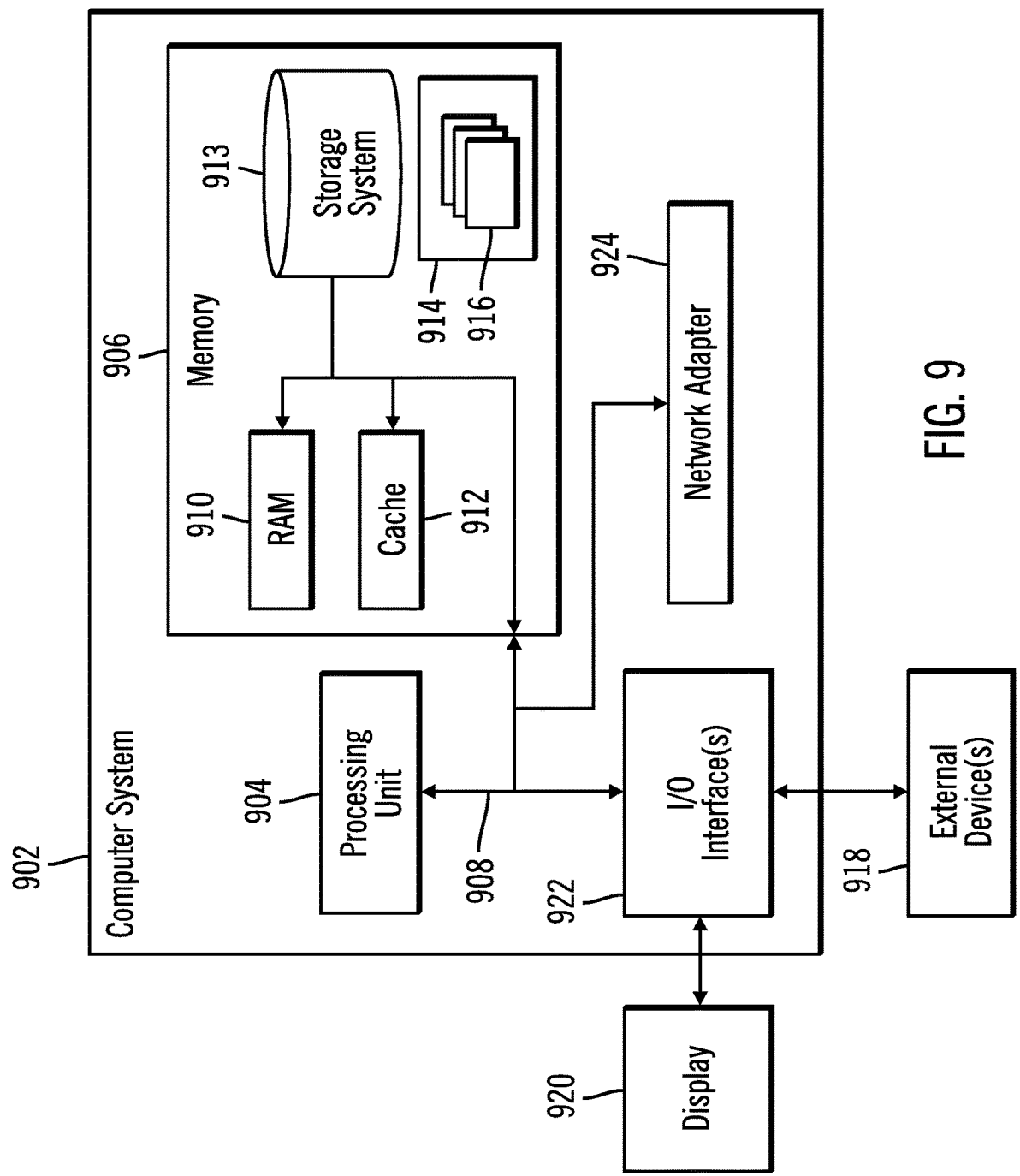
FIG. 9 illustrates a computing environment in which the components of FIG. 1 may be implemented.

As shown in FIG. 9, the computer system/server 902 is shown in the form of a general-purpose computing device. The components of computer system/server 902 may include, but are not limited to, one or more processors or processing units 904, a system memory 906, and a bus 908 that couples various system components including system memory 906 to processor 904. Bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media.

System memory 906 can include computer system readable media in the form of volatile memory, such as random access memory (RAM) 910 and/or cache memory 912. Computer system/server 902 may further include other removable/non-removable, volatile/non-volatile computer system storage media. By way of example only, storage system 913 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 908 by one or more data media interfaces. As will be further depicted and described below, memory 906 may include at least one program product having a set (e.g., at least one) of program modules that are configured to carry out the functions of embodiments of the invention.

Program/utility 914, having a set (at least one) of program modules 916, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. The components of the computer 902 may be implemented as program modules 916 which generally carry out the functions and/or methodologies of embodiments of the invention as described herein. The systems of FIG. 1 may be implemented in one or more computer systems 902, where if they are implemented in multiple computer systems 902, then the computer systems may communicate over a network.

Computer system/server 902 may also communicate with one or more external devices 918 such as a keyboard, a pointing device, a display 920, etc.; one or more devices that enable a user to interact with computer system/server 902; and/or any devices (e.g., network card, modem, etc.) that enable computer system/server 902 to communicate with one or more other computing devices. Such communication can occur via Input/Output (I/O) interfaces 922. Still yet, computer system/server 902 can communicate with one or more networks such as a local area network (LAN), a general wide area network (WAN), and/or a public network (e.g., the Internet) via network adapter 924. As depicted, network adapter 924 communicates with the other components of computer system/server 902 via bus 908. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing a point-in-time copy of a source storage unit configured in a storage, the computer program product comprises a computer readable storage medium having program instructions embodied therewith, the program instructions executable by a processor to cause operations, the operations comprising:
   creating a point-in-time copy to maintain tracks in the source storage unit as of a point-in-time;
   providing a source copy data structure indicating tracks in the source storage unit to copy to a point-in-time data location;
   receiving an update to write to a source track in the source storage unit;
   determining whether the source copy data structure indicates to copy the source track to the point-in-time data location;
   writing, to a cache, the update to the source track; and
   initiating a copy operation to copy the source track from the source storage unit to the point-in-time data location asynchronous with respect to writing the update to the source track to the cache and destaging the update to the source track from the cache to the source storage unit.

2. The computer program product of claim 1, wherein the operations further comprise:
   indicating in the source copy data structure to not copy the source track to the point-in-time data location in response to the copy operation copying the source track from the source storage unit to the point-in-time data location.

3. The computer program product of claim 1, wherein the operations further comprise:
   indicating in the source copy data structure to copy all tracks in the source storage unit in the storage to the point-in-time data location when creating the point-in-time copy.

4. The computer program product of claim 1, wherein the operations further comprise:
   initiating an operation to destage an update to a track in the cache to the storage;
   determining whether the source copy data structure indicates to copy the track to destage from the source storage unit to the point-in-time data location in response to initiating the operation to destage the update to the track;
   copying the track to destage from the source storage unit to the point-in-time data location in response to determining that the source copy data structure indicates to copy the track; and
   writing the update to the track to destage from the cache to the source storage unit in response to copying the track from the storage to the point-in-time data location.

5. The computer program product of claim 4, wherein the operations further comprise:
   writing the update to the track to destage to the source storage unit in response to determining that the source copy data structure does not indicate to copy the track to destage from the source storage unit to the point-in-time data location.

6. The computer program product of claim 1, wherein the point-in-time copy comprises a first point-in-time copy and the point-in-time of the point-in-time copy comprises a first point-in-time, wherein the operations further comprise:
   initiating an operation to create a second point-in-time copy at a second point-in-time;
   in response initiating the operation to create the second point-in-time copy, performing:
      determining tracks having updates in the cache;
      copying each track of the determined tracks from the source storage unit to the point-in-time data location in response to the source copy data structure indicating to copy the track; and
      destaging updates in the cache to the storage for each track copied from the source storage unit to the point-in-time data location.

7. The computer program product of claim 6, wherein the operations performed in response to initiating the operation to create the second point-in-time copy further comprise:
   indicating in the source copy data structure to not copy each track, having updates in the cache, copied from the source storage unit to the point-in-time data location.

8. The computer program product of claim 6, wherein the operations performed in response to initiating the operation to create the second point-in-time copy further comprise:
   destaging updates to tracks in the cache to the source storage unit that the source copy data structure indicates to not copy from the source storage unit to the point-in-time data location.

9. The computer program product of claim 6, wherein the initiating the operation to create the second point-in-time copy is performed in response to receiving a reservation command as part of creating a second point-in-time copy to perform a reservation operation, wherein the operations further comprise:
returning complete to the reservation command after destaging updates to the determined tracks having updates in the cache;
receiving a freeze command to suspend I/O operations to the source storage unit after returning complete to the reservation command;
returning complete to the freeze command in response to suspending I/O operations to the source storage unit;
receiving a thaw command to end suspension of I/O operations to the source storage unit; and
recording updates to tracks in the source storage unit for the second point-in-time copy in response to returning complete to the thaw command after ending suspension of the I/O operations.

10. The computer program product of claim 1, wherein the point-in-time copy comprises a first point-in-time copy and the point-in-time of the point-in-time copy comprises a first point-in-time, wherein the source track comprises a first source track, wherein the operations further comprise:
initiating an operation to establish a second point-in-time copy at a second point-in-time;
in response initiating the operation to create the second point-in-time copy, performing:
receiving a write to update a second source track in the source storage unit while performing operations to establish the second point-in-time copy and before establishing and starting the second point-in-time copy;
determining whether there is a previous update to the second source track in the cache;
determining whether the source copy data structure indicates to copy the second source track in response to determining the previous update to the second source track in the cache;
copying the second source track in the source storage unit to the point-in-time data location in response to determining that the source copy data structure indicates to copy the second source track;
destaging the previous update for the second source track from the cache to the source storage unit in response to copying the second source track in the source storage unit to the point-in-time data location; and
writing the update to the second source track to the cache after destaging the previous update.

11. The computer program product of claim 10, wherein the operations performed in response to initiating the operation to create the second point-in-time copy further comprise:
indicating in the source copy data structure to not copy the second source track from the source storage unit to the point-in-time data location in response to copying the second source track in the source storage unit to the point-in-time data location.

12. The computer program product of claim 10, wherein the operations performed in response to initiating the operation to create the second point-in-time copy further comprise:
destaging the previous update for the second source track from the cache to the source storage unit in response to determining that the source copy data structure indicates to not copy the second source track from the source storage unit to the point-in-time data location.

13. The computer program product of claim 10, wherein the operations performed in response to initiating the operation to create the second point-in-time copy further comprise:
writing the update to the second source track to the cache in response to determining that there is no previous update to the second source track in the cache.

14. The computer program product of claim 10, wherein the operations performed in response to initiating the operation to create the second point-in-time copy further comprise:
setting the source copy data structure to indicate to copy all the tracks from the source storage unit to the point-in-time data location before destaging updates to tracks in the cache.

15. A system for managing a point-in-time copy of a source storage unit configured in a storage, comprising:
a processor; and
a computer readable storage medium having program instructions embodied therewith, the program instructions that when executed by a processor perform operations, the operations comprising:
creating a point-in-time copy to maintain tracks in the source storage unit as of a point-in-time;
providing a source copy data structure indicating tracks in the source storage unit to copy to a point-in-time data location;
receiving an update to write to a source track in the source storage unit;
determining whether the source copy data structure indicates to copy the source track to the point-in-time data location;
writing, to a cache, the update to the source track; and
initiating a copy operation to copy the source track from the source storage unit to the point-in-time data location asynchronous with respect to writing the update to the source track to the cache and destaging the update to the source track from the cache to the source storage unit.

16. The system of claim 15, wherein the operations further comprise:
indicating in the source copy data structure to copy all tracks in the source storage unit in the storage to the point-in-time data location when creating the point-in-time copy.

17. The system of claim 15, wherein the operations further comprise:
initiating an operation to destage an update to a track in the cache to the source storage unit;
determining whether the source copy data structure indicates to copy the track to destage from the source storage unit to the point-in-time data location in response to initiating the operation to destage the update to the track;
copying the track to destage from the source storage unit to the point-in-time data location in response to determining that the source copy data structure indicates to copy the track; and
writing the update to the track to destage from the cache to the source storage unit in response to copying the track from the source storage unit to the point-in-time data location.

18. The system of claim 15, wherein the point-in-time copy comprises a first point-in-time copy and the point-intime of the point-in-time copy comprises a first point-in-time, wherein the operations further comprise:
  initiating an operation to create a second point-in-time copy at a second point-in-time;
  in response initiating the operation to create the second point-in-time copy, performing:
    determining tracks having updates in the cache;
    copying each track of the determined tracks from the source storage unit to the point-in-time data location in response to the source copy data structure indicating to copy the track; and
    destaging updates in the cache to the source storage unit for each track copied from the source storage unit to the point-in-time data location.

19. The system of claim 15, wherein the point-in-time copy comprises a first point-in-time copy and the point-in-time of the point-in-time copy comprises a first point-in-time, wherein the source track comprises a first source track, wherein the operations further comprise:
  initiating an operation to establish a second point-in-time copy at a second point-in-time;
  in response initiating the operation to create the second point-in-time copy, performing:
    receiving a write to update a second source track in the source storage unit while performing operations to establish the point-in-time copy and before establishing and starting the point-in-time copy;
    determining whether there is a previous update to the second source track in the cache;
    determining whether the source copy data structure indicates to copy the second source track in response to determining the previous update to the second source track in the cache;
    copying the second source track in the source storage unit to the point-in-time data location in response to determining that the source copy data structure indicates to copy the second source track;
    destaging the previous update for the second source track from the cache to the source storage unit in response to copying the second source track in the source storage unit to the point-in-time data location; and
    writing the update to the second source track to the cache after destaging the previous update.

20. A method for managing a point-in-time copy of a source storage unit configured in a storage, comprising:
  creating a point-in-time copy to maintain tracks in the source storage unit as of a point-in-time;
  providing a source copy data structure indicating tracks in the source storage unit to copy to a point-in-time data location;
  receiving an update to write to a source track in the source storage unit;
  determining whether the source copy data structure indicates to copy the source track to the point-in-time data location;
  writing, to a cache, the update to the source track; and
  initiating a copy operation to copy the source track from the source storage unit to the point-in-time data location asynchronous with respect to writing the update to the source track to the cache and destaging the update to the source track from the cache to the source storage unit.

21. The method of claim 20, further comprising:
  indicating in the source copy data structure to copy all tracks in the source storage unit in the storage to the point-in-time data location when creating the point-in-time copy.

22. The method of claim 20, further comprising:
  initiating an operation to destage an update to a track in the cache to the source storage unit;
  determining whether the source copy data structure indicates to copy the track to destage from the source storage unit to the point-in-time data location in response to initiating the operation to destage the update to the track;
  copying the track to destage from the source storage unit to the point-in-time data location in response to determining that the source copy data structure indicates to copy the track; and
  writing the update to the track to destage from the cache to the source storage unit in response to copying the track from the source storage unit to the point-in-time data location.

23. The method of claim 20, wherein the point-in-time copy comprises a first point-in-time copy and the point-in-time of the point-in-time copy comprises a first point-in-time, further comprising:
  initiating an operation to create a second point-in-time copy at a second point-in-time;
  in response initiating the operation to create the second point-in-time copy, performing:
    determining tracks having updates in the cache;
    copying each track of the determined tracks from the source storage unit to the point-in-time data location in response to the source copy data structure indicating to copy the track; and
    destaging updates in the cache to the source storage unit for each track copied from the source storage unit to the point-in-time data location.

24. The method of claim 20, wherein the point-in-time copy comprises a first point-in-time copy and the point-in-time of the point-in-time copy comprises a first point-in-time, wherein the source track comprises a first source track, further comprising:
  initiating an operation to establish a second point-in-time copy at a second point-in-time;
  in response initiating the operation to create the second point-in-time copy, performing:
    receiving a write to update a second source track in the source storage unit while performing operations to establish the point-in-time copy and before establishing and starting the point-in-time copy;
    determining whether there is a previous update to the second source track in the cache;
    determining whether the source copy data structure indicates to copy the second source track in response to determining the previous update to the second source track in the cache;
    copying the second source track in the source storage unit to the point-in-time data location in response to determining that the source copy data structure indicates to copy the second source track;
    destaging the previous update for the second source track from the cache to the source storage unit in response to copying the second source track in the source storage unit to the point-in-time data location; and writing the update to the second source track to the cache after destaging the previous update.

* * * * *